United States Patent
Kataoka et al.

(10) Patent No.: US 12,093,324 B2
(45) Date of Patent: Sep. 17, 2024

(54) SCORING DEVICE, SCORING METHOD, AND RECORDING MEDIUM

(71) Applicant: NEC CORPORATION, Tokyo (JP)

(72) Inventors: Toshiyuki Kataoka, Tokyo (JP); Shun Maruyama, Tokyo (JP); Jun Onodera, Tokyo (JP); Satoshi Shimada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 838 days.

(21) Appl. No.: 17/056,057

(22) PCT Filed: Apr. 17, 2019

(86) PCT No.: PCT/JP2019/016394
§ 371 (c)(1),
(2) Date: Nov. 17, 2020

(87) PCT Pub. No.: WO2019/225229
PCT Pub. Date: Nov. 28, 2019

(65) Prior Publication Data
US 2021/0287563 A1 Sep. 16, 2021

(30) Foreign Application Priority Data
May 25, 2018 (JP) .................. 2018-100499

(51) Int. Cl.
*G06F 16/906* (2019.01)
*G06F 3/14* (2006.01)
(Continued)

(52) U.S. Cl.
CPC .......... *G06F 16/906* (2019.01); *G06F 16/285* (2019.01); *G09B 7/02* (2013.01); *G06F 3/14* (2013.01); *G09B 19/00* (2013.01)

(58) Field of Classification Search
CPC ........ G06F 16/906; G06F 16/285; G06F 3/14; G09B 7/02; G09B 19/00; G06Q 50/20
See application file for complete search history.

(56) References Cited

U.S. PATENT DOCUMENTS

| | | | |
|---|---|---|---|
| 2012/0166208 A1* | 6/2012 | Gillam | G16H 50/70 705/2 |
| 2015/0317383 A1* | 11/2015 | Alkov | G06F 16/287 707/738 |
| 2021/0034817 A1* | 2/2021 | Asao | G06N 3/045 |

FOREIGN PATENT DOCUMENTS

| | | | | |
|---|---|---|---|---|
| CN | 101118554 A | * | 2/2008 | ......... G06F 17/3043 |
| JP | 2003050539 A | * | 2/2003 | |

(Continued)

OTHER PUBLICATIONS

Koji Nakajima, "Development and evaluation of a tool for assisting in grading answer described in short answer-type", Proceedings of the 17th Annual Meeting of the Association for Natural Language Processing: tutorial, plenary session, workshop, Mar. 2011, 6 pages.

(Continued)

*Primary Examiner* — Jeffrey S Vanderveen
(74) *Attorney, Agent, or Firm* — Sughrue Mion, PLLC

(57) ABSTRACT

A scoring device includes a classifying unit and an adding unit. The classifying unit classifies answer data into a plurality of subsets. The adding unit adds a scoring criterion to be used in scoring the answer data based on a result of classifying by the classifying unit.

9 Claims, 20 Drawing Sheets

(51) Int. Cl.
    *G06F 16/28*    (2019.01)
    *G09B 7/02*     (2006.01)
    *G09B 19/00*    (2006.01)

(56) References Cited

FOREIGN PATENT DOCUMENTS

| JP | 2006-78740 | A |   | 3/2006 |
|----|------------|---|---|--------|
| JP | 2006078740 | A | * | 3/2006 |
| JP | 2013191158 | A | * | 9/2013 |
| JP | 2016-24282 | A |   | 2/2016 |
| JP | 2016024282 | A | * | 2/2016 |
| JP | 2017167413 | A | * | 9/2017 |
| JP | 2018063600 | A | * | 4/2018 |
| JP | 2019113591 | A | * | 7/2019 |
| KR | 20150096294| A | * | 8/2015 |

OTHER PUBLICATIONS

Kazumasa Oshima et al., "Development of a system for assisting in grading test described in short answer-type-Classification of answers based on keyword usage", Proceedings of the 2011 PC Conference, Aug. 2011, 5 pages.

Naoki Morita, "A method of classifying description answers on real time", FIT2002 Forum on Information Technology, Information technology letters, vol. 1, Sep. 2002, 4 pages.

International search report for PCT/JP2019/06394 dated Jul. 9, 2019.

Japanese Office Action for JP Application No. 2020-521097 mailed on Nov. 30, 2021 with English Translation.

\* cited by examiner

Fig.2A

| MODEL ANSWER | HE THOUGHT IT WAS SMALL MOON RABBIT BECAUSE HE DISCOVERED FROM AGREEMENT DUE TO STREAM OF THOUGHT. |
|---|---|

| EXAMPLE ANSWER | |
|---|---|
| 1 | FROM DISCOVERY OF AGREEMENT DUE TO STREAM OF THOUGHT, HE THOUGHT IT WAS SMALL MOON RABBIT. |
| 2 | REASON HE THOUGHT IT WAS SMALL MOON RABBIT IS BECAUSE HE FOUND AGREEMENT DUE TO STREAM OF THOUGHT AND DISCOVERED. |
| 3 | HE THOUGHT IT WAS SMALL MOON RABBIT BECAUSE HE FOUND AGREEMENT DUE TO STRERAM FLOW OF THOUGHT AND DISCOVERED. |
| 4 | HE REGARDED IT AS SMALL MOON RABBIT BECAUSE HE FINALLY DISCOVERED FROM AGREEMENT DUE TO STREAM OF THOUGHT. |

Fig.2B

| MODEL ANSWER | ABLE TO ORGANIZE MAIN POINTS AND SOLVE PROBLEM IN SHORT TIME. |
|---|---|

142

| EXAMPLE ANSWER | |
|---|---|
| 1 | ORGANIZE MAIN POINTS |
| 2 | SORT OUT IMPORTANT POINTS |
| 3 | CLARIFY AND SORT OUT IMPORTANT POINTS |

| ANSWER CLUSTER | REPRESENTATIVE SENTENCE | NUMBER |
|---|---|---|
| 1 | FEW YEARS LATER, AGREEMENT DUE TO STREAM OF THOUGHT OCCURRED AND HE DISCOVERED THAT HE THOUGHT IT SMALL MOON RABBIT. | 281 |
| 2 | SINCE AGREEMENT OF STREAM OF THOUGHT OCCURRED AND HE DISCOVERED, HE THOUGHT IT WAS SMALL MOON RABBIT. | 273 |
| 3 | HE THOUGHT IT WAS SMALL MOON RABBIT OR CAT IN ELEVATOR BECAUSE OF DISCOVERY OF AGREEMENT DUE TO STREAM OF ENFORCEMENT. | 248 |
| 4 | ALL PHENOMENA SUCH AS SMALL MOON RABBIT ARE BECAUSE OF DISCOVERY DERIVED FROM AGREEMENT DUE TO STREAM OF THOUGHT. | 244 |
| ⋮ | ⋮ | ⋮ |

Fig.3B

| ANSWER CLUSTER | REPRESENTATIVE SENTENCE | NUMBER |
|---|---|---|
| 1 | BY ARRANGING AND SORTING OUT MAIN POINTS | 320 |
| 2 | BY WRITING IMPORTANT ITEMS OF TASK | 263 |
| 3 | BY ORGANIZING SUMMARY AND KEY POINTS OF TASK | 247 |
| ⋮ | ⋮ | ⋮ |

Fig.4A

| | |
|---|---|
| 1 | FROM DISCOVERY OF AGREEMENT DUE TO STREAM OF THOUGHT, HE THOUGHT IT WAS SMALL MOON RABBIT. |
| 2 | REASON HE THOUGHT IT WAS SMALL MOON RABBIT IS BECAUSE HE FOUND AGREEMENT DUE TO STREAM OF THOUGHT AND DISCOVERED. |
| 3 | HE THOUGHT IT WAS SMALL MOON RABBIT BECAUSE HE FOUND AGREEMENT DUE TO STRERAM FLOW OF THOUGHT AND DISCOVERED. |
| 4 | HE REGARDED IT AS SMALL MOON RABBIT BECAUSE HE FINALLY DISCOVERED FROM AGREEMENT DUE TO STREAM OF THOUGHT. |
| 5 | FEW YEARS LATER, AGREEMENT DUE TO STREAM OF THOUGHT OCCURRED AND HE DISCOVERED THAT HE THOUGHT IT SMALL MOON RABBIT. |
| 6 | SINCE AGREEMENT OF STREAM OF THOUGHT OCCURRED AND HE DISCOVERED, HE THOUGHT IT WAS SMALL MOON RABBIT. |
| 7 | HE THOUGHT IT WAS SMALL MOON RABBIT OR CAT IN ELEVATOR BECAUSE OF DISCOVERY OF AGREEMENT DUE TO STREAM OF ENFORCEMENT. |
| 8 | ALL PHENOMENA SUCH AS SMALL MOON RABBIT ARE BECAUSE OF DISCOVERY DERIVED FROM AGREEMENT DUE TO STREAM OF THOUGHT. |

| 1 | ORGANIZE MAIN POINTS |
| --- | --- |
| 2 | SORT OUT IMPORTANT POINTS |
| 3 | CLARIFY AND SORT OUT IMPORTANT POINTS |
| 4 | BY ARRANGING AND SORTING OUT MAIN POINTS |
| 5 | BY WRITING IMPORTANT ITEMS OF TASK |
| 6 | BY ORGANIZING SUMMARY AND KEY POINTS OF TASK |

Fig.5

| EXAMPLE ANSWER 1 | EXAMPLE ANSWER 2 | EXAMPLE ANSWER 3 | EXAMPLE ANSWER 4 |
|---|---|---|---|
| FROM DISCOVERY OF AGREEMENT DUE TO STREAM OF THOUGHT, HE THOUGHT IT WAS SMALL MOON RABBIT. | REASON HE THOUGHT IT WAS SMALL MOON RABBIT IS BECAUSE HE FOUND AGREEMENT DUE TO STREAM OF THOUGHT AND DISCOVERED. | HE THOUGHT IT WAS SMALL MOON RABBIT BECAUSE HE FOUND AGREEMENT DUE TO STRERAM FLOW OF THOUGHT AND DISCOVERED. | HE REGARDED IT AS SMALL MOON RABBIT BECAUSE HE FINALLY DISCOVERED FROM AGREEMENT DUE TO STREAM OF THOUGHT. |

<RESULT OF CLUSTERING>

| | | | |
|---|---|---|---|
| ○○○○ | △△△△△ | ☐☐☐☐☐ | × × × × × |
| ○○○○ | △△△△△ | ☐☐☐☐☐ | × × × × × |
| ○○○○ | △△△△△ | | × × × × × |
| | △△△△△ | | |

Fig.6

| EXAMPLE ANSWER 1 | EXAMPLE ANSWER 2 | EXAMPLE ANSWER 3 | EXAMPLE ANSWER 4 |
|---|---|---|---|
| FROM DISCOVERY OF AGREEMENT DUE TO STREAM OF THOUGHT, HE THOUGHT IT WAS SMALL MOON RABBIT. | REASON HE THOUGHT IT WAS SMALL MOON RABBIT IS BECAUSE HE FOUND AGREEMENT DUE TO STREAM OF THOUGHT AND DISCOVERED. | HE THOUGHT IT WAS SMALL MOON RABBIT BECAUSE HE FOUND AGREEMENT DUE TO STREAM FLOW OF THOUGHT AND DISCOVERED. | HE REGARDED IT AS SMALL MOON RABBIT BECAUSE HE FINALLY DISCOVERED FROM AGREEMENT DUE TO STREAM OF THOUGHT. |

<RESULT OF CLUSTERING>

| | | | |
|---|---|---|---|
| ○○○○ | △△△△△ | | |
| ○○○○ | △△△△△ | ☐☐☐☐☐ | × × × × |
| ○○○○ | △△△△△ | ☐☐☐☐☐ | × × × × |
| | △△△△△ | | × × × × |

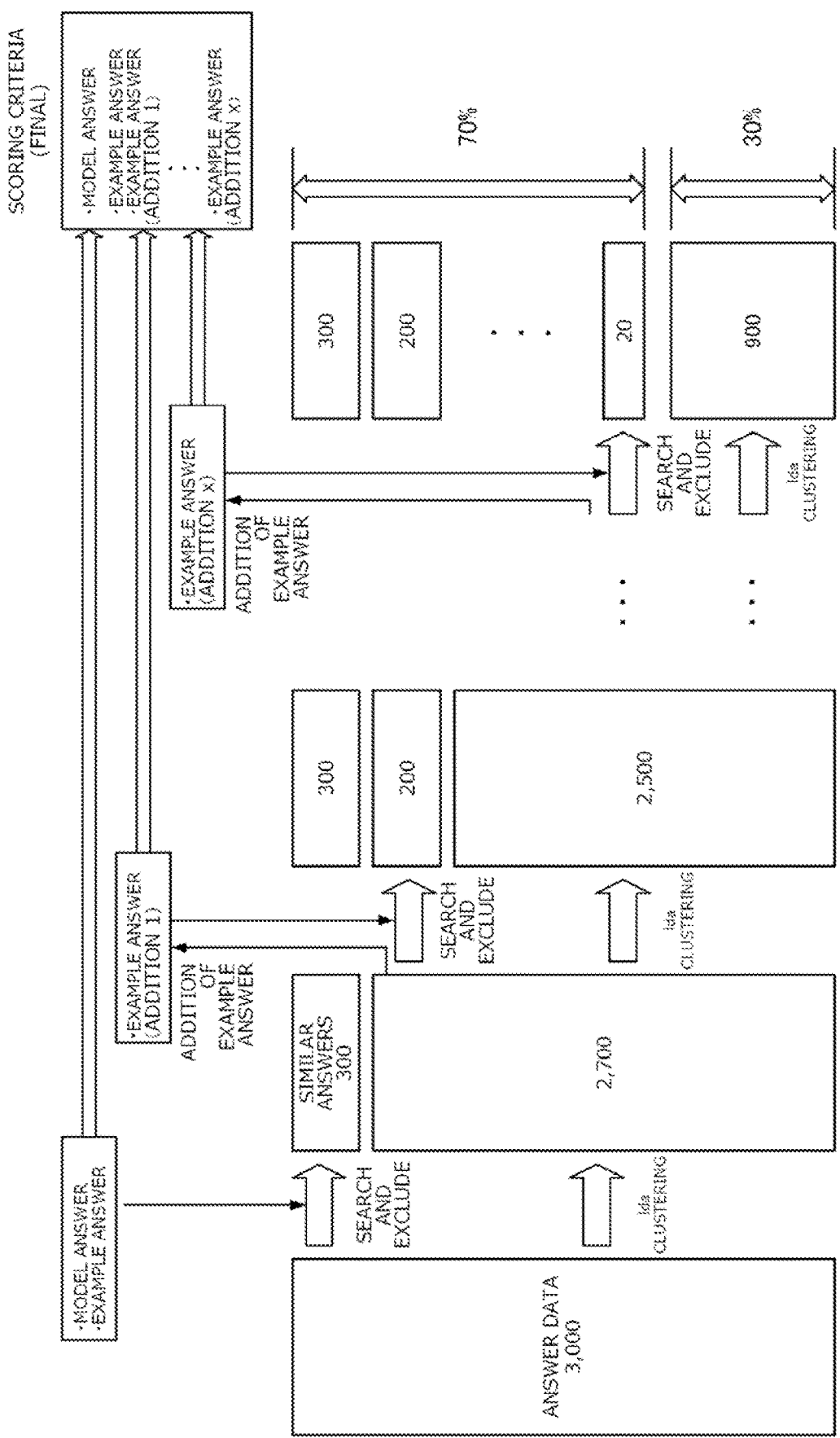

Fig.12A

| ANSWER CLUSTER | REPRESENTATIVE SENTENCE | NUMBER |
|---|---|---|
| 1 | BY ARRANGING AND SORTING OUT MAIN POINTS | 320 |
| 2 | BY WRITING IMPORTANT ITEMS OF TASK | 263 |
| 3 | BY ORGANIZING SUMMARY AND KEY POINTS OF TASK | 247 |
| ⋮ | ⋮ | ⋮ |

Fig.12B

| ANSWER CLUSTER | REPRESENTATIVE SENTENCE | NUMBER |
|---|---|---|
| 1 | CLARIFY AND SORT OUT IMPORTANT ITEMS | 162 |
| 2 | BY CLARIFYING AND ARRANGING MAIN ITEMS | 147 |
| 3 | BY ORGANIZING SUMMARY AND KEY POINTS OF TASK | 124 |
| ⋮ | ⋮ | ⋮ |

Fig.13B

| | | |
|---|---|---|
| 1 | ORGANIZE MAIN POINTS | |
| 2 | SORT OUT IMPORTANT POINTS | |
| 3 | CLARIFY AND SORT OUT IMPORTANT POINTS | 143 |
| 4 | BY ARRANGING AND SORTING OUT MAIN POINTS | |
| 5 | BY WRITING IMPORTANT ITEMS OF TASK | |
| 6 | BY ORGANIZING SUMMARY AND KEY POINTS OF TASK | |
| 7 | CLARIFY AND SORT OUT IMPORTANT ITEMS | |
| 8 | BY CLARIFYING AND ARRANGING MAIN ITEMS | |
| 9 | BY ORGANIZING SUMMARY AND KEY POINTS OF TASK | |

SCORING DEVICE, SCORING METHOD, AND RECORDING MEDIUM

CROSS-REFERENCE TO RELATED APPLICATIONS

This application is a National Stage of International Application No. PCT/JP2019/016394 filed Apr. 17, 2019, which claims priority under U.S.C. § 119(a) to Japanese Patent Application No. JP2018-100499 filed on May 25, 2018.

TECHNICAL FIELD

The present invention relates to a scoring device, a scoring method, and a recording medium.

BACKGROUND ART

In recent years, there has been an increasing need for not only a computer-scored exam but also a descriptive exam.

In order to efficiently give a descriptive exam, it is necessary to efficiently score the answer to a descriptive question. A technique for assisting such efficient scoring is described in, for example, Patent Document 1. Patent Document 1 describes a scoring assisting system that includes a display unit, an unscored answer group forming means, an unscored answer group list forming means, an unscored answer pattern group range selecting means, and a scored answer pattern group forming means. According to Patent Document 1, the unscored answer group forming means classifies a plurality of unscored answer data for each identical answer content, and creates a plurality of unscored answer pattern groups. The unscored answer group list forming means determines the degrees of similarity of the answer contents of the unscored answer pattern groups to a reference answer content that is a criterion, and causes the display unit to display a scoring group list in which the unscored answer pattern groups are arranged in descending order of the degree of similarity. Then, the unscored answer pattern group range selection means sets the unscored answer pattern groups selected through a range selection operation by an operation unit to a state in which identical scoring information can be added. After that, the scored answer pattern group forming means collectively adds scoring information set through a scoring information setting operation to the selected unscored answer pattern groups, and changes the selected unscored answer pattern groups to scored answer pattern groups.

Patent Document 1: Japanese Unexamined Patent Application Publication No. JP-A 2017-167413

In the case of the technique described in Patent Document 1, a scorer who operates the operation unit determines the answer pattern groups displayed on the display unit to which the same scoring information is added. Therefore, there is a risk that the results of scoring vary with scorer.

As a method for preventing such variation with scorer, there is a method in which a plurality of scorers perform scoring and a plurality of scoring results are compared. However, the abovementioned method is very troublesome and inefficient because a plurality of scorers score the same question. That is to say, the abovementioned method has a problem that the efficiency of scoring is sacrificed.

Thus, there has been a problem that it is difficult to score an answer to a descriptive question while preventing variation with scorer.

SUMMARY

Accordingly, an object of the present invention is to provide a scoring device, a scoring method and a recording medium that solve the problem that it is difficult to score an answer to a descriptive question while preventing variation with scorer.

In order to achieve the object, a scoring device according to an aspect of the present invention includes: a classifying unit configured to classify answer data into a plurality of subsets; and an adding unit configured to add a scoring criterion to be used in scoring the answer data based on a result of classifying by the classifying unit.

Further, a scoring method according to another aspect of the present invention is a scoring method executed by a scoring device. The scoring method includes: classifying answer data into a plurality of subsets; and adding a scoring criterion to be used in scoring the answer data based on a result of classifying.

Further, a recording medium according to another aspect of the present invention is a non-transitory computer-readable recording medium having a program recorded thereon. The program includes instructions for causing an information processing device to realize: a classifying unit configured to classify answer data into a plurality of subsets; and an adding unit configured to add a scoring criterion to be used in scoring the answer data based on a result of classifying by the classifying unit.

With the configurations as described above, the present invention can provide a scoring device, a scoring method and a recording medium that solve the problem that it is difficult to score an answer to a descriptive question while preventing variation with scorer.

BRIEF DESCRIPTION OF DRAWINGS

FIG. 2A is a view showing an example of a model answer and an example answer;

FIG. 2B is a view showing another example of the model answer and the example answer;

FIG. 3A is a view showing an example of a result of clustering answer data by a clustering unit;

FIG. 3B is a view showing another example of a result of clustering answer data by the clustering unit;

FIG. 4A is a view showing an example of a configuration in a case where an example answer is added;

FIG. 5 is a view showing an example of display by a display unit;

FIG. 6 is a view showing another example of display by the display unit;

FIG. 11 is a view showing an example of processing by the scoring device in the second example embodiment of the present invention;

FIG. 12A is a view showing an example of a result of clustering answer data by the clustering unit;

FIG. 12B is a view showing another example of a result of clustering answer data by the clustering unit;

FIG. 13B is a view showing another example of a configuration in a case where an example answer is added;

EXAMPLE EMBODIMENTS

First Example Embodiment

Figure 1:
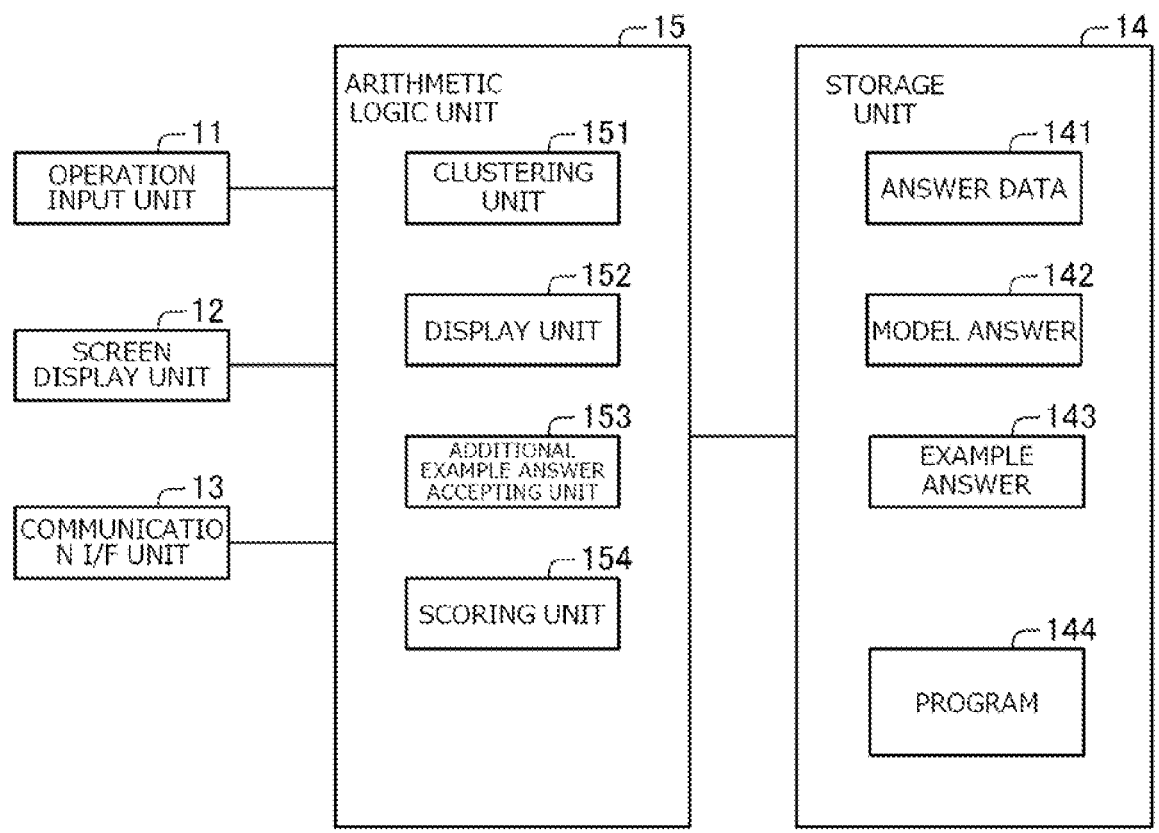
FIG. 1 is a block diagram showing an example of a configuration of a scoring device in a first example embodiment of the present invention.
Figure 7:
FIG. 7 is a view showing another example of display by the display unit.
Figure 8:
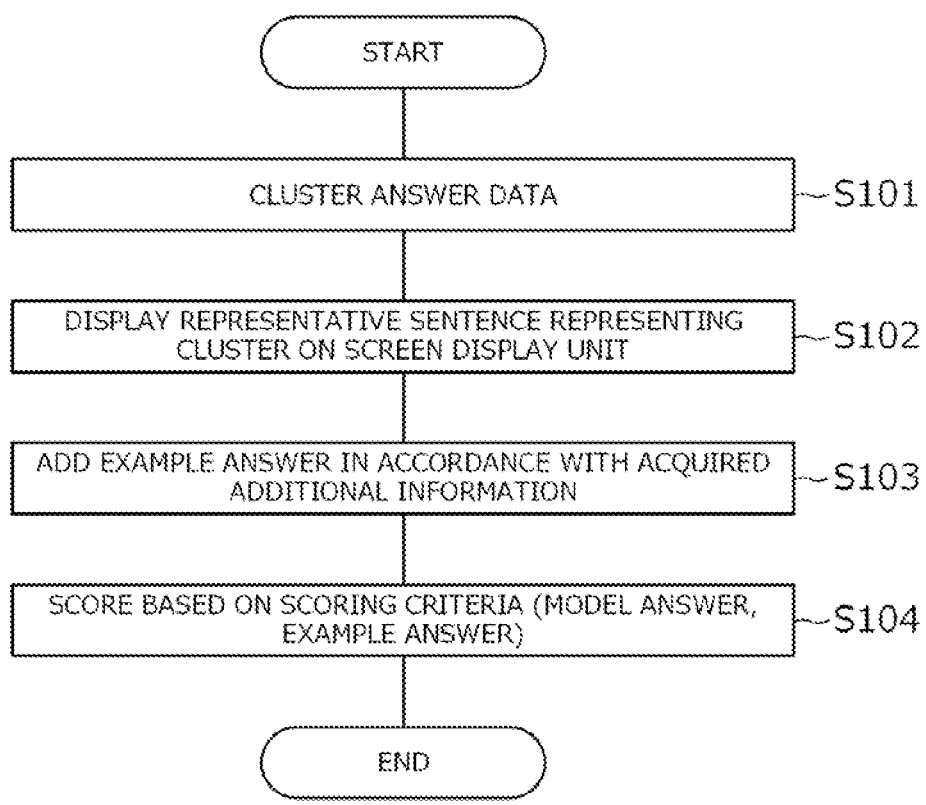
FIG. 8 is a flowchart showing an example of an operation of the scoring device in the first example embodiment of the present invention.
Figure 9:
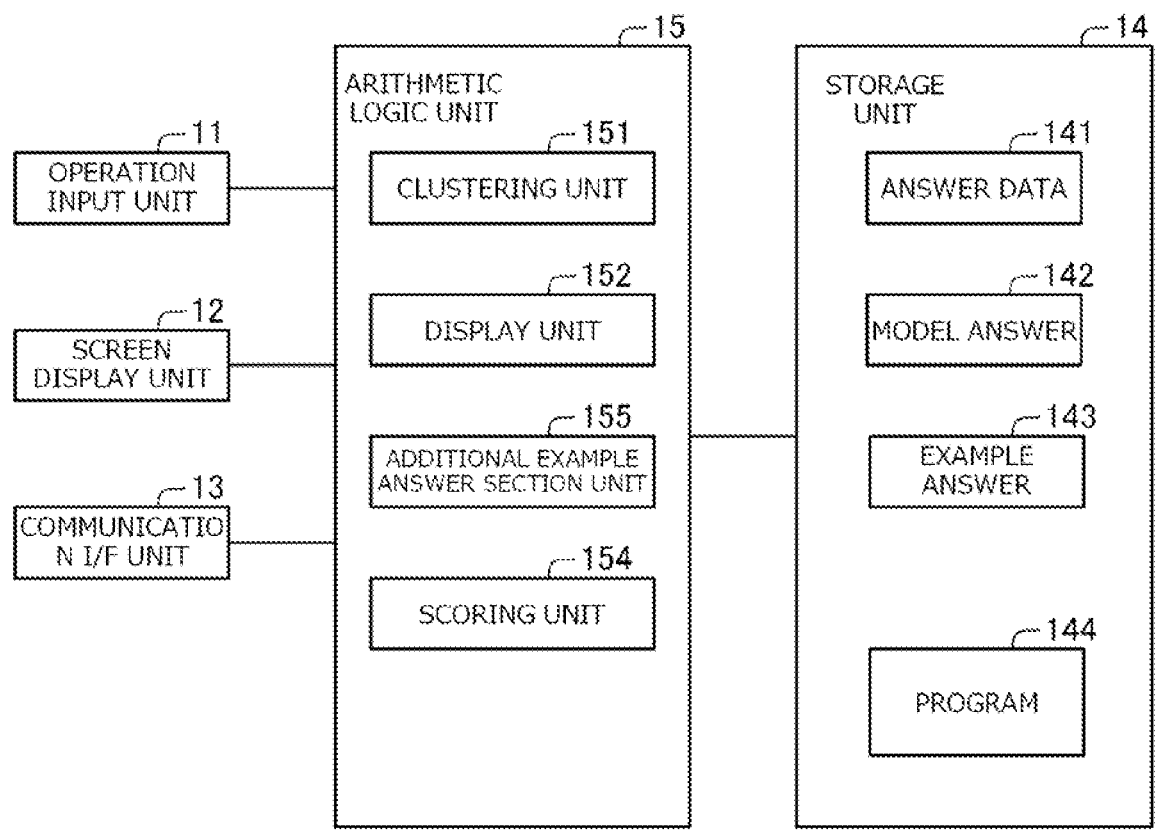
FIG. 9 is a block diagram showing an example of another configuration of the scoring device in the first example embodiment of the present invention.

A first example embodiment of the present invention will be described with reference to FIGS. 1 to 9. FIG. 1 is a block diagram showing an example of a configuration of a scoring device 1. FIG. 2 is a view showing an example of a model answer 142 and an example answer 143. FIG. 3 is a view showing an example of a result of clustering answer data 141 by a clustering unit 151. FIG. 4 is a view showing an example of the example answer 143 in a case where an example answer is added. FIGS. 5 to 7 are views showing examples of display by a display unit 152. FIG. 8 is a flowchart showing an example of an operation of the scoring device 1. FIG. 9 is a block diagram showing an example of another configuration of the scoring device 1.

In the first example embodiment of the present invention, the scoring device 1 that is an information processing device automatically scoring an answer to a descriptive question based on scoring criteria will be described. For example, the scoring device 1 stores the scoring criteria beforehand. Moreover, the scoring device 1 is configured to add, to the scoring criteria, a description content that does not correspond to the scoring criteria stored beforehand but can be determined to be a correct answer. For example, as will be described later, the scoring device 1 displays the result of clustering an answer group included in the answer data 141 to the scorer of the scoring device 1. Upon acquiring information indicating a cluster to be added to the scoring criteria from the scorer, the scoring device 1 adds a representative sentence representing the cluster indicated by the acquired information to the scoring criteria. In this manner, the scoring device 1 adds a scoring criterion to the scoring criteria based on the result of clustering the answer group included in the answer data 141. After that, the scoring device 1 scores the answer group included in the answer data 141 based on the scoring criteria with the scoring criterion being added.

In this example embodiment, the scoring device 1 stores, for example, a model answer 142 that is a model answer to a question and an example answer 143 that is a criterion different from the model answer 142 as the scoring criteria beforehand. Meanwhile, the scoring device 1 may not necessarily store the model answer 142 and the example answer 143 as the scoring criteria. For example, the scoring device 1 may store beforehand either the model answer 142 or the example answer 143, or may store neither. For example, the scoring device 1 may be configured to score the answer group included in the answer data 141 based on only the scoring criteria with a scoring criterion being added based on the result of clustering the answer group included in the answer data 141.

FIG. 1 shows an example of a configuration of the scoring device 1. Referring to FIG. 1, the scoring device 1 includes, as major components, an operation input unit 11, a screen display unit 12, a communication I/F unit 13, a storage unit 14, and an arithmetic logic unit 15.

The operation input unit 11 includes an operation input device such as a keyboard and a mouse. The operation input unit 11 detects an operation by a scorer, who is the operator of the scoring device 1, and outputs to the arithmetic logic unit 15.

The screen display unit 12 includes a screen display device such as an LCD (Liquid Crystal Display). The screen display unit 12 displays various information on a screen in accordance with an instruction from the arithmetic logic unit 15.

The communication I/F unit 13 includes a data communication circuit. The communication I/F unit 13 performs data communication with various devices connected via a communication line.

The storage unit 14 is a storage device such as a hard disk and a memory. In the storage unit 14, processing information necessary for various kinds of processing in the arithmetic logic unit 15 and a program 144 are stored. The program 144 is loaded into and executed by the arithmetic logic unit 15 and thereby realizes the respective processing units. The program 144 is loaded from an external device (not shown) or a recording medium (not shown) via a data input/output function such as the communication I/F unit 13 and stored in the storage unit 14 beforehand. Major information stored in the storage unit 14 includes the answer data 141, the model answer 142, and the example answer 143.

The answer data 141 shows an answer to a descriptive question solved beforehand by an answerer who solves the descriptive question. The answer data 141 includes, for example, answers by a plurality of answerers. That is to say, the answer data 141 includes an answer group.

For example, in the case of an examination format in which an answerer answers on a paper medium, an answer included in the answer data 141 is generated beforehand by applying OCR (Optical Character Recognition) and scanning an answer sheet on which the answerer has answered. Alternatively, the answer data 141 is generated beforehand by, for example, a keypuncher manually inputting. Thus, an answer included in the answer data 141 is generated beforehand by performing preprocessing such as scanning on a paper medium, for example. The answer included in the answer data 141 may be generated by the answerer directly inputting the answer to an information processing device or the like.

The model answer 142 shows an example of a model answer to a descriptive question. As stated above, the model answer 142 is one of the scoring criteria. The model answer 142 is input by a scorer beforehand. For example, the model answer 142 may be input beforehand by the scorer using the operation input unit 11, or may be input beforehand from an external device via the communication I/F unit 13.

FIG. 2 shows an example of the scoring criteria including the model answer 142 and the example answer 143. To be specific, FIG. 2A shows an example of the scoring criteria including the model answer 142 and the example answer 143 for one question, and FIG. 2B shows an example of the scoring criteria including the model answer 142 and the example answer 143 for another question.

Referring to FIG. 2A, for example, a model answer to one question is, "He thought it was a small moon rabbit because he discovered from agreement due to the stream of thought." As will be described later, among the answer group included in the answer data 141, an answer determined to correspond to the model answer by the scoring unit 154 is determined to be a right answer by the scoring unit 154, for example. Moreover, referring to FIG. 2B, for example, a model answer to another question is, "Able to organize main points and solve problem in a short time." In this manner, one model answer 142 is generated beforehand for one question, for example. Meanwhile, a plurality of model answers 142 may be generated beforehand for a question.

The example answer 143 shows an example of an answer to a descriptive question. As stated above, the example answer 143 is one of the scoring criteria.

The example answer 143 shows, for example, an answer which should be determined to be a correct answer though the expression thereof is different from that of the model answer 142. For example, answers to a descriptive question contain descriptive fluctuations (word fluctuations and sentence fluctuations). Therefore, in a case where the scoring criteria include only the model answer 142, there is a risk an answer is out of a range of determining to be a correct answer because of, for example, differences in words and expressions actually used in the answer even if the description content of the answer is correct. By using the example answer 143, it becomes possible to determine an answer to be a right answer, for example, in which the expression is not the same as that of the model answer 142 but the description content is correct, and it is possible to reduce the risk as described above.

Part of the example answer 143 is input by the scorer beforehand as with the model answer 142, for example. That is to say, part of the example answer 143 is input by the scorer by using the operation input unit 11 beforehand, or input from an external device via the communication I/F unit 13 beforehand.

FIGS. 2A and 2B show the examples of the example answer 143 input beforehand. For example, FIG. 2A illustrates a case in which four example answers are input as the example answer 143 beforehand. Moreover, FIG. 2B illustrates a case in which three example answers are input as the example answer 143 beforehand. Thus, as the example answer 143, any number of example answers can be input beforehand.

Further, for example, a representative sentence representing a cluster based on the result of clustering the answer data 141 can be added to the example answer 143.

For example, FIG. 3 shows an example of the result of clustering the answer data. To be specific, FIG. 3A shows an example of the result of clustering the answer group to a problem to which the model answer 142 is as shown in FIG. 2A, and FIG. 3B shows an example of the result of clustering the answer group to a problem to which the model answer 142 is as shown in FIG. 2B. As will be described later, the scoring device 1 displays, on the screen display unit 12, a representative sentence representing each of the clusters generated as a result of clustering the answer data 141 as shown in FIGS. 3A and 3B. In response to this, the scorer selects a representative sentence to be added to the example answer 143. As a result, the scoring device 1 can add the representative sentence selected by the scorer to the example answer 143.

Figure 4B:
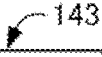
FIG. 4B is a view showing another example of a configuration in a case where an example answer is added.

FIG. 4 shows an example of the example answer 143 added as a result of selection by the scorer. To be specific, FIG. 4A shows an example of the example answer 143 when the representative sentence shown in FIG. 3A is added to the example answer 143 shown in FIG. 2A. That is to say, FIG. 4A shows a case in which top four (answer clusters 1, 2, 3 and 4) of the representative sentences shown in FIG. 3A are selected by the scorer. Moreover, FIG. 4B shows an example of the example answer 143 when the representative sentence shown in FIG. 3B is added to the example answer 143 shown in FIG. 2B. That is to say, FIG. 4B shows a case in which top three (answer clusters 1, 2 and 3) of the representative sentences shown in FIG. 3B are selected by the scorer.

As described above, the example answer 143 can include an example answer input beforehand. Moreover, the example answer 143 can include a representative sentence of a cluster generated as a result of clustering the answer group included in the answer data 141.

The example answer 143 may include an answer indicating an incorrect answer. As will be described later, among the answer group included in the answer data 141, an answer determined to correspond to the answer indicating an incorrect answer by the scoring unit 154 is determined to be a wrong answer by the scoring unit 154, for example. As with the abovementioned case, the example answer or representative sentence indicating an incorrect answer included in the example answer 143 may be input by the scorer beforehand, or may be added based on the result of clustering the answer data 141.

The arithmetic logic unit 15 includes a microprocessor such as an MPU and peripheral circuits thereof. The arithmetic logic unit 15 loads the program 144 from the storage unit 14 and executes it to make the abovementioned hardware and the program 144 cooperate and realize various processing units. The major processing units realized by the arithmetic logic unit 15 include a clustering unit 151 (a classifying unit), a display unit 152, an additional example answer accepting unit 153 (an adding unit), and a scoring unit 154.

The clustering unit 151 performs clustering of the answer group included in the answer data 141. For example, the clustering unit 151 performs clustering by generating clusters so that answers having close degrees of similarities between answers included in the answer data 141 are classified into the same cluster (subset). Moreover, the clustering unit 151 determines the degree of similarity by calculating a given score for each answer, for example.

To be specific, the clustering unit 151 generates clusters by using a known method such as LDA (Latent Dirichlet Allocation), K-means method, or repeated bisection method. For example, the clustering unit 151 calculates the appearance rate of elements for each topic, and calculates the topic score (degree of similarity) of each answer included in the answer data 141 based on the result of the calculation. Then, based on the calculated topic scores, the clustering unit 151 determines answers having close topic scores to be similar, and generates clusters so that the similar answers are classified into the same cluster. For example, the clustering unit 151 performs clustering by such a process. The clustering unit 151 may determine the degree of similarity, for example, based on the feature vector of each answer included in the answer data 141 (for example, a feature vector calculated based on the weight of a keyword included in the answer).

Further, the clustering unit 151 generates, for each of the generated clusters, a representative sentence representing the cluster. The clustering unit 151 can generate a representative sentence by using a known technique as with when performing clustering. For example, for the cluster including the model answer 142 or the example answer 143, the clustering unit 151 sets the corresponding model answer 142 or example answer 143 as a representative sentence. Moreover, for the cluster that does not correspond to the model answer 142 or the example answer 143, the clustering unit 151 generates a representative sentence by performing extraction in accordance with a predetermined input pattern from each of the answers in the cluster. The clustering unit 151 may be configured to, after generating a plurality of representative sentences by extraction, perform a selection process, for example, by the use of a hierarchical structure and then select one representative sentence.

As will be described later, the scoring device can be configured to display, on the screen display unit 12, only information (for example, a representative sentence) of clusters that do not correspond to the model answer 142 or the example answer 143 among the clusters generated by the clustering unit 151. Therefore, the clustering unit 151 may be configured not to generate representative sentences for clusters corresponding to the model answer 142 and the example answer 143 (clusters including the model answer 142 and the example answer 143).

The display unit 152 presents the result of clustering by the clustering unit 151 to the scorer. For example, the display unit 152 displays a representative sentence representing each cluster generated as a result of clustering by the clustering unit 151 on the screen display unit 12, and thereby presents the result of clustering to the scorer. Moreover, the display unit 152 can control a position to display each cluster based on, for example, the degree of similarity between the model answer 142 or the example answer 143 and the cluster.

The degree of similarity used by the display unit 152 when controlling display can be generated, for example, based on a given score such as a topic score calculated by the clustering unit 151 when performing clustering. That is to say, the degree of similarity of each cluster can be generated based on the degree of similarity of each answer included in the cluster. For example, the degree of similarity of each cluster is the degree of similarity of a representative answer among the answers included in the cluster. Meanwhile, the degree of similarity used by the display unit 152 when controlling display may be a different one from the degree of similarity used by the clustering unit when performing clustering.

FIGS. 5 to 7 show examples of display by the display unit 152. For example, as shown in FIG. 5, the display unit 152 can display the model answer 142 and the example answers in the example answer 143, and can also display a representative sentence representing a similar cluster (for example, a cluster with a high matching score) below the model answer 142 and the example answers in the example answer 143. For example, in the case shown in FIG. 5, below an example answer 1, "From discovery of agreement due to the stream of thought, he thought it was a small moon rabbit," a representative sentence representing a cluster similar to the example answer 1 is displayed. Thus, the display unit 152 can change a position to display a representative sentence representing a cluster in accordance with a topic score or the like calculated by the clustering unit 152 when executing clustering.

Further, for example, as shown in FIG. 6, the display unit 152 may perform highlighting such as changing the color of a cluster to display (a representative sentence representing the cluster) in accordance with the topic score calculated by the clustering unit 151 when executing clustering. That is to say, the display unit 152 may be configured to highlight a cluster having a higher degree of similarity to the example answer than a given level (a higher matching score than a reference threshold value). For example, in the case shown in FIG. 6, a middle one among the three clusters similar to the example answer 1 is a cluster having a higher degree of similarity to the example answer than a given level.

Further, for example, as shown in FIG. 7, the display unit 152 may change the order of clusters to display (representative sentences representing the clusters) in accordance with the topic scores calculated by the clustering unit 151 when executing clustering. For example, the display unit 152 can display the clusters from top to bottom in order from the cluster having the highest degree of similarity (the highest matching score).

As described above, the display unit 152 displays the result of clustering by the clustering unit 151 on the screen display unit 12. Moreover, the display unit 152 can execute various display controls such as changing a position to display a cluster, highlighting and changing the order to display in accordance with the score calculated by the clustering unit 151.

The display unit 152 may execute a display control other than the display controls illustrated above. Moreover, the display unit 152 may execute only one of the display controls illustrated above, or may execute some of the display controls in combination.

Further, as stated above, the display unit 152 can be configured to display, on the screen display unit 12, only information (for example, a representative sentence) of a cluster which does not correspond to the model answer 142 or the example answer 143 among the clusters generated by the clustering unit 151. The display unit 152 may be configured to display information of all the clusters generated by the clustering unit 151 on the screen display unit 12.

The additional example answer accepting unit 153 accepts information (additional information) indicating a cluster selected by the scorer. Then, the additional example answer accepting unit 153 adds a representative sentence of the cluster indicated by the accepted information as an example answer to the example answer 143. Thus, the additional example answer accepting unit 153 adds the example answer 143 in accordance with selection by the scorer.

As described above, the display unit 152 displays a representative sentence of each cluster generated as a result of clustering by the clustering unit 151 on the screen display unit 12. Then, the scorer who operates the scoring device 1 selects a cluster which is determined to be a cluster different from the model answer 142 and the example answer 143 but should be included in the example answer 143 from among the clusters represented by the representative sentences displayed on the screen display unit 12. At this time, the scorer can select any number of clusters. Depending on the selection by the scorer, the additional example answer accepting unit 153 adds the representative sentence of the cluster indicated by the received information to the example answer 143.

The scoring unit 154 scores the answer group included in the answer data 141 by using the example answer 143 added by the additional example answer accepting unit 153 and the model answer 142 as the scoring criteria. For example, the scoring unit 154 searches for an answer in the answer data 141 having an entailment relation with, that is, having an equivalent meaning to the model answer 142 and the example answer 143 included in the scoring criteria, and performs scoring based on the result of the searching. For example, the scoring unit 154 determines the answer in the answer data 141 searched as having an entailment relation with the model answer 142 to be a correct answer. Likewise, the scoring unit 154 determines the answer in the answer data 141 searched as having an entailment relation with the example answer which should be determined to be a correct answer in the example answer 143, to be a correct answer. For example, in this manner, the scoring unit 154 scores the answer group included in the answer data 141 by using the example answer 143 added by the additional example answer accepting unit 153 and the model answer 142 as the scoring criteria. In this scoring, there may be a plurality of scoring criteria for one answer. For example, the scoring unit 154 can score the answer group included in the answer data 141 by using a plurality of example answers 143 and one or a plurality of model answers 142 corresponding to a plurality of scoring criteria as the scoring criteria for the answer data 141. That is to say, the scoring unit 154 can be configured to perform scoring in different manners depending on a plurality of scoring criteria on the answer group included in the answer data 141.

The above is an example of the configuration of the scoring device 1. Subsequently, an example of the operation of the scoring device 1 will be described with reference to FIG. 8.

FIG. 8 shows an example of an operation of the scoring device 1. Referring to FIG. 8, when the answer data 141 is input, the clustering unit 151 of the scoring device 1 performs clustering of the answer data 141 (step S101). For example, the clustering unit 151 performs clustering by LDA. Moreover, the clustering unit 151 generates a representative sentence representing each of the clusters.

The display unit 152 displays the result of clustering by the clustering unit 151 on the screen display unit 12. For example, the display unit 152 displays the representative sentence representing each of the clusters generated by the clustering unit 151 on the screen display unit 12 (step S102). At this time, the display unit 152 can execute various display controls depending on a score calculated by the clustering unit 151, or the like.

The additional example answer accepting unit 153 of the scoring device 1 accepts additional information that is the result of selection by the scorer. By the processing at step S102 described above, the representative sentence representing each of the clusters generated as a result of clustering by the clustering unit 151 is displayed on the screen display unit 12. Then, the scorer operating the scoring device 1 selects a cluster which is determined to be a cluster different from the model answer 142 and the example answer 143 but should be included in the example answer, from among the clusters represented by the representative sentences displayed on the screen display unit 12. With this, the additional example answer accepting unit 153 acquires additional information indicating the cluster selected by the scorer. Then, based on the acquired additional information, the additional example answer accepting unit 153 adds the representative sentence representing the cluster selected by the scorer as an example answer to the example answer 143 (step S103).

The scoring unit 154 scores the answer group included in the answer data 141 by using the example answer 143 with the example answer being added by the additional example answer accepting unit 153 and the model answer 142 as the scoring criteria (step S104).

The above is an example of the operation of the scoring device 1.

Thus, the scoring device 1 includes the clustering unit 151, the display unit 152, the additional example answer accepting unit 153, and the scoring unit 154. With such a configuration, the additional example answer accepting unit 153 can acquire information indicating a cluster selected by the scorer from among representative sentences of clusters generated as a result of clustering by the clustering unit 151 displayed on the screen display unit 12 by the display unit 152. As a result, the scoring unit 154 can score the answer group in the answer data 141 based on the scoring criteria with the example answer being added by the additional example answer accepting unit 153. Thus, in the scoring device 1 described in this example embodiment, the example answer 143 to be a scoring criterion is added in selection by the scorer, and scoring is performed based on the scoring criteria with the example answer being added. Therefore, it is possible to efficiently perform scoring while preventing the occurrence of erroneous determination such as determining an answer which should be determined to be correct actually, to be an incorrect answer due to the fluctuation of words and phrases. Moreover, since scoring is performed based on the scoring criteria, it is possible to prevent variations in scoring due to differences in scorers.

The configuration of the scoring device 1 is not limited to the case illustrated in this example embodiment. For example, FIG. 9 shows another configuration example of the scoring device 1. Referring to FIG. 9, for example, the scoring device 1 includes an additional example answer selection unit 155, instead of the additional example answer accepting unit 153.

The additional example answer selection unit 155 automatically selects a representative sentence to be added to the example answer 143 from among representative sentences representing clusters generated by the clustering unit 151, based on the degrees of similarity of the respective clusters generated by the clustering unit 151 (topic scores calculated at the time of executing clustering, or the like). For example, the additional example answer selection unit 155 selects a representative sentence representing a cluster having a higher score of matching a cluster including the model answer 142 and the example answer included in the example answer 143 than a given level (that is, a cluster which is more similar to the model answer 142 and the example answer 143 than a given level), as a representative sentence to be added to the example answer 143. Then, the additional example answer selection unit 155 adds the selected representative sentence to the example answer 143.

For example, as described above, the scoring device 1 can include the additional example answer selection unit 155 that automatically selects a representative sentence to be added to the example answer 143 based on a calculated score or the like instead of the selection by the scorer. In a case where the scoring device 1 includes the additional example answer selection unit 155, the scoring device 1 does not need to include the display unit 152. Alternatively, the scoring device 1 may include both the additional example answer accepting unit 153 and the additional example answer selection unit 155.

Further, in FIG. 1, a case where the scoring device 1 is realized by one information processing device is illustrated. Meanwhile, the scoring device 1 may be realized by a plurality of information processing devices. For example, the scoring device 1 may be configured by two information processing devices: an information processing device having a function as the clustering unit 151, the display unit 152 and the additional example answer accepting unit 153, and an information processing device having a function as the scoring unit 154. Moreover, for example, the scoring device 1 may be configured to generate a plurality of scoring criteria by a plurality of information processing devices each having a function as the clustering unit 151, the display unit 152 and the additional example answer accepting unit 153, and performing scoring by an information processing device having a function as the scoring unit 154 based on the generated scoring criteria.

Further, the scoring unit 154 may be configured not only to determine whether an answer is correct or incorrect but also to perform evaluation in a plurality of stages. That is to say, the scoring unit 154 may be configured to give different scores depending on answers, such as 1 point, 2 points, and 3 points. Such a configuration can be realized by associating scores with the model answer 142 and the example answer 143, for example, when generating the model answer 142 and the answer example 143 or when adding the answer example 143. For example, assuming that the model answer 142 is associated with a score "5 points", the scoring unit 154 assigns the score "5 points" associated with the model answer 142 beforehand to an answer in the answer data 141 searched as having an entailment relation with the model answer 142. By thus associating scores with the model answer 142 and the respective example answers in the answer example 143 beforehand, the scoring unit 154 can perform determination that is not simply determining whether an answer is correct or incorrect.

Further, the clustering unit 151 may perform clustering by a method other than the illustrated above. For example, the clustering unit 151 may be configured to perform hierarchical clustering.

Further, in this example embodiment, the scoring device 1 includes the clustering unit 151. Meanwhile, the scoring unit 1 may use any method other than clustering as far as a plurality of subsets can be generated from the answer group included in the answer data 141. For example, the scoring device 1 may be configured to generate subsets by performing given classification on the answer group included in the answer data 141 by using a method other than illustrated in this example embodiment.

Second Example Embodiment

Figure 10:
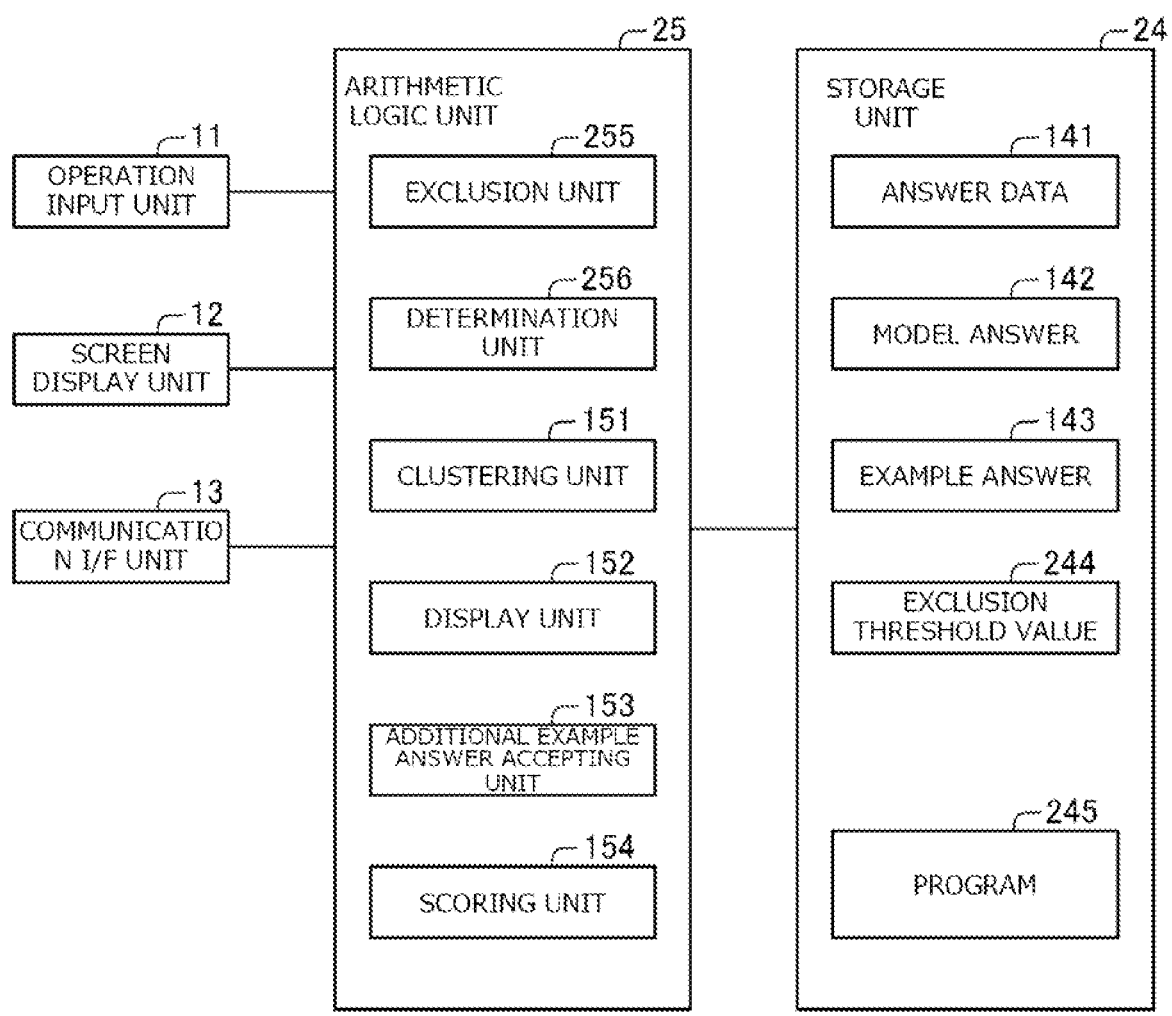
FIG. 10 is a block diagram showing an example of a configuration of a scoring device in a second example embodiment of the present invention.
Figure 13A:
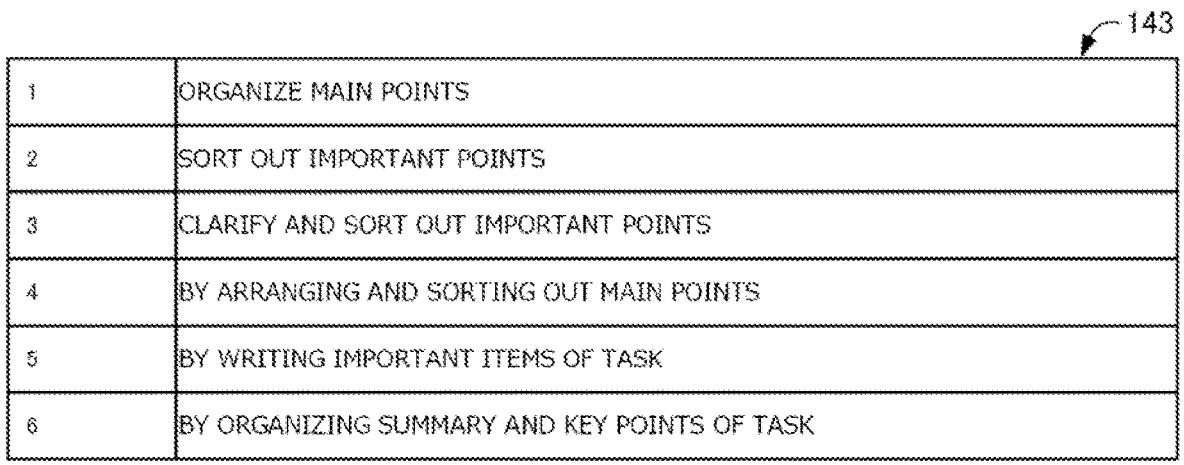
FIG. 13A is a view showing an example of a configuration in a case where an example answer is added.
Figure 14:
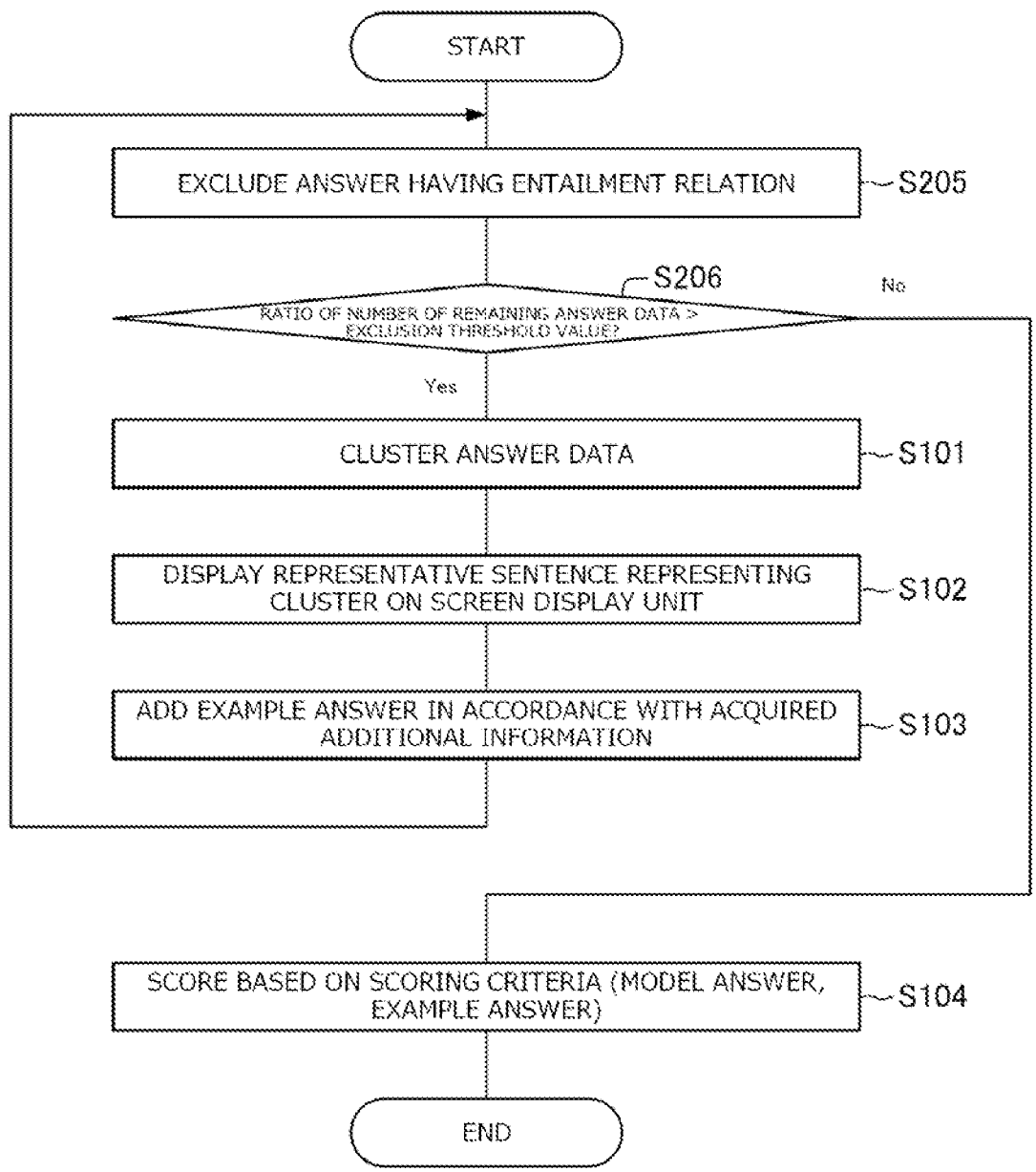
FIG. 14 is a flowchart showing an example of an operation of the scoring device in the second example embodiment of the present invention.

Next, a second example embodiment of the present invention will be described with reference to FIGS. 10 to 14. FIG. 10 is a block diagram showing an example of a configuration of a scoring device 2. FIG. 11 is a view showing an example of processing by the scoring device 2. FIG. 12 is a view showing an example of a result of clustering the answer data 141 by the clustering unit 151. FIG. 13 is a view showing an example of the example answer 143 when an example answer is added. FIG. 14 is a flowchart showing an example of an operation of the scoring device 2.

In the second example embodiment of the present invention, the deice 2, which is a modified example of the scoring device 1 described in the first example embodiment, will be described. As will be described later, the scoring device 2 searches for and excludes an answer in the answer data 141 having an entailment relation with the scoring criteria. Then, the scoring device 2 clusters remaining answer data, which is data having not been excluded from the answer group in the answer data 141. After that, the scoring device 2 searches for and excludes an answer having an entailment relation based on the scoring criteria to which an example answer has been newly added as a result of the clustering. For example, the scoring device 2 repeats the process as described above until the ratio of the number of the remaining answer data to the number of all the answers in the answer data 141 becomes equal to or less than an exclusion threshold value 244. Thus, the scoring device 2 in this example embodiment is configured to perform clustering a plurality of times while performing the exclusion process.

FIG. 10 shows an example of a configuration of the scoring device 2. Referring to FIG. 10, the scoring device 1 includes, as major components, the operation input unit 11, the screen display unit 12, the communication I/F unit 13, a storage unit 24, and an arithmetic logic unit 25. In FIG. 10, the same components as those of the scoring device 1 described in the first example embodiment (see FIG. 1) are denoted by the same reference numerals as those in FIG. 1. Below, a component characteristic to this example embodiment will be described.

The storage unit 24 is a storage device such as a hard disk and a memory. In the storage unit 24, processing information necessary for various kinds of processing in the arithmetic logic unit 25 and a program 245 are stored. The program 245 is loaded into and executed by the arithmetic logic unit 25 and thereby realizes the respective processing units. The program 245 is loaded beforehand from an external device (not shown) or a recording medium (not shown) via a data input/output function such as the communication I/F unit 13, and stored in the storage unit 24. Major information stored in the storage unit 24 includes the answer data 141, the model answer 142, the example answer 143, and the exclusion threshold value 244.

The exclusion threshold value 244 is a threshold value indicating a ratio of exclusion by an exclusion unit 255 to be described later. The exclusion unit 255 to be described later repeats the exclusion process until the ratio of the number of the remaining answer data to the number of all the answers in the answer data 141 becomes equal to or less than the exclusion threshold value 244.

For example, a value indicated by the exclusion threshold value 244 is 30%. A value indicated by the exclusion threshold value 244 may be other than the illustrated one.

The arithmetic logic unit 25 includes a microprocessor such as an MPU and peripheral circuits thereof. The arithmetic logic unit 25 loads the program 245 from the storage unit 24 and executes it to make the abovementioned hardware and the program 245 cooperate and realize various processing units. The major processing units realized by the arithmetic logic unit 25 include the exclusion unit 255, a determination unit 256, the clustering unit 151, the display unit 152, the additional example answer accepting unit 153, and the scoring unit 154.

The exclusion unit 255 searches for an answer in the answer data 141 having an entailment relation with the model answer 142 and the example answer 143 that are included in the scoring criteria. Then, the exclusion unit 255 excludes the searched answer from the answer data 141. In this manner, the exclusion unit 255 excludes at least part of the answer group included in the answer data 141 based on the model answer 142 and the example answer 143. The clustering unit 151 clusters the remaining answer data, that is, the answers having not been excluded by the exclusion unit 255 among the answers in the answer data 141.

For example, the exclusion unit 255 performs the abovementioned exclusion process before the additional example answer accepting unit 153 adds the answer example 143, and performs the abovementioned exclusion process every time the additional example answer accepting unit 153 adds the answer example 143.

FIG. 11 shows an example of the relation between the exclusion process by the exclusion unit 255 and the clustering by the clustering unit 151. To be specific, in FIG. 11, a case where the answer data 141 includes 3000 answers is illustrated. In the case shown in FIG. 11, a value indicated by the exclusion threshold value 244 is 30%.

Referring to FIG. 11, the exclusion unit 255 performs the exclusion process based on the model answer 142 and the example answer 143 that are stored in the storage unit 24 beforehand. For example, in the case shown in FIG. 11, the exclusion unit 255 determines that 300 answers of the 3000 answers included in the answer data 141 have an entailment relation with the model answer 142 and the example answer 143 stored in the storage unit 24 beforehand. Therefore, the exclusion unit 255 excludes the abovementioned 300 answers.

When the abovementioned 300 answers are excluded, the ratio of the number of the remaining answer data (2700) to the number of all the answers in the answer data 141 (3000) is 90%, which is more than 30%. Therefore, the clustering unit 151 clusters the remaining answer data, and the display unit 152 displays representative sentences representing the clusters on the screen display unit 12. Then, the additional example answer accepting unit 153 adds to the example answer 143 in accordance with selection by the scorer. As a result, as shown in FIG. 11, an example answer (addition 1) is added to the example answer 143.

To be specific, for example, FIG. 12A shows an example of the result of first clustering. When representative sentences shown in FIG. 12A are added to the example answer 143, the example answer 143 is as shown in FIG. 13A, for example. Thus, also in this example embodiment, an example answer is added to the example answer 143 based on the result of clustering as in the first example embodiment. For example, in the example shown in FIG. 13A, the example answer 143 includes six example answers in total: three example answers stored in advance and three example answers newly added.

Subsequently, the exclusion unit 255 searches for and excludes an answer in the answer data 141 having an entailment relation with the newly added example answer 143 (that is, the example answer (addition 1)). For example, in the case shown in FIG. 11, the exclusion unit 255 determines that 200 answers have an entailment relation with the newly added example answer 143. Therefore, the exclusion unit 255 excludes the abovementioned 200 answers. Even at this stage, the ratio of the number of the remaining answer data (2500) to the number of all the answers (3000) in the answer data 141 is 83.3%, which is more than 30%. Therefore, the clustering unit 151 clusters the remaining answer data, and the display unit 152 displays representative sentences representing the clusters on the screen display unit 12. Then, the additional example answer accepting unit 153 adds the answer example 143 in accordance with selection by the scorer.

For example, FIG. 12B shows an example of the result of second clustering. When the representative sentences shown in FIG. 12B are added to the example answer 143, the example answer 143 is as shown in FIG. 13B, for example. That is to say, as show in FIG. 13B, as a result of second addition, the example answer 143 includes nine example answers. Thus, the number of example answers included in the example answer 143 increases every time clustering is performed.

The process as described above is repeated until the ratio of the number of the remaining answer data to the number of all the answers in the answer data 141 becomes equal to or less than 30%, which is the exclusion threshold 244. For example, in the case shown in FIG. 11, the number of the remaining answer data becomes 900 as a result of the $x^{th}$ exclusion process, and the ratio of the number of the remaining answer data to the number of all the answers in the answer data 141 becomes equal to or less 30%. At this stage, the clustering unit 151 does not newly cluster the remaining answer data, and the scoring unit 154 performs scoring.

The determination unit 256 determines whether or not to cluster the remaining answer data i based on the exclusion threshold value 244. For example, the determination unit 256 determines to cause the clustering unit 151 to perform the clustering in a case where the ratio of the number of the remaining answer data to the number of all the answers in the answer data 141 is more than the exclusion threshold value 244. When the determination unit 256 determines to perform the clustering, the clustering unit 151 performs the clustering. On the other hand, in a case where the ratio of the number of the remaining answer data to the number of all the answers in the answer data 141 is equal to or less than the exclusion threshold value 244, the determination unit 256 determines not to cause the clustering unit 151 to perform the clustering. In this case, the scoring unit 154 performs scoring.

The scoring unit 154 performs scoring based on the scoring criteria as in the first example embodiment. For example, in the case shown in FIG. 11, the scoring criteria includes, in addition to the model answer 142 and the example answer 143 stored in the storage unit 24 in advance, the example answers added up to the $x^{th}$ time. The scoring unit 154 performs scoring based on the scoring criteria including the model answer 142 and the example answer 143 as described above.

In this example embodiment, the scoring unit 154 can automatically score only the answers excluded by the exclusion unit 255 (the answers that are not the remaining answer data) among all the answers included in the answer data 141. In a case where the scoring unit 154 is thus configured, the remaining answer data in the answer data 141 is, for example, scored visually without being scored by the scoring unit 154. For example, in the case shown in FIG. 11, 900 answers that are the remaining answer data are scored visually without being scored by the scoring unit 154.

Thus, the scoring unit 154 may be configured to automatically score part of all the answers included in the answer data 141. In other words, it can be said that the scoring device 2 can be configured to separate the answer group in the answer data 141 into a group to be automatically scored and a group not to be automatically scored.

The above is an example of the configuration of the scoring device 2. Subsequently, an example of the operation of the scoring device 2 will be described with reference to FIG. 14.

FIG. 14 shows an example of an operation of the scoring device 2. Referring to FIG. 14, the exclusion unit 255 performs the exclusion process based on the model answer 142 and the example answer 143 stored in the storage unit 24 in advance (step S205).

The determination unit 256 determines whether or not to cluster the remaining answer data based on the exclusion threshold value 244 (step S206). For example, in a case where the ratio of the number of the remaining answer data to the number of all the answers in the answer data 141 is more than the exclusion threshold value (step S206, Yes), the determination unit 256 determines to cause the clustering unit 151 to perform the clustering. When the determination unit 256 determines to perform the clustering, the clustering unit 151 clusters the remaining answer data (step S101). Moreover, the display unit 152 displays the result of the clustering by the clustering unit 151 on the screen display unit 12 (step S102). Then, the additional example answer accepting unit 153 adds a representative sentence representing a cluster selected by the scorer as an example answer to the example answer 143 (step S103). After the above process, the operation returns to step S205.

On the other hand, in a case where the ratio of the number of the remaining answer data to the number of all the answers in the answer data 141 is equal to or less than the exclusion threshold value 244 (step S206, No), the determination unit 256 determines not to cause the clustering unit 151 to perform the clustering. In this case the scoring unit 154 performs scoring based on the scoring criteria (step S104). At this time, the scoring unit 154 can automatically score only the answers excluded by the exclusion unit 255 (the answers that are not the remaining answer data) among all the answers included in the answer data 141.

Thus, the scoring device 2 includes the exclusion unit 255 and the determination unit 256. With such a configuration, the clustering unit 151 can cluster only the remaining answer data, that is, the data except the answer data excluded by the exclusion unit 255. With this, for example, it becomes possible to efficiently repeat the clustering.

Further, in this example embodiment, the scoring unit 154 can automatically score only the answers excluded by the exclusion unit 255 (the answers that are not the remaining answer data) among all the answers included in the answer data 141. Such a configuration makes it possible to visually score an answer that is hard to determine whether it is correct or incorrect in the clustering. As a result, it becomes possible to reduce a possibility to perform wrongful scoring while realizing efficient scoring.

Meanwhile, as with the scoring device 1, various modified examples can be adopted for the scoring device 2 described in this example embodiment.

Third Example Embodiment

Next, a third example embodiment of the present invention will be described with reference to FIG. 15. In the third example embodiment, the overview of a configuration of a scoring device 3 will be described.

Figure 15:
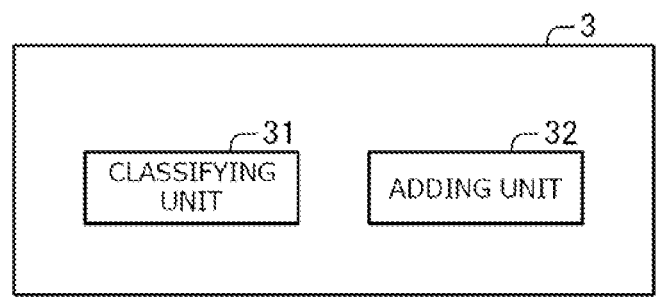
FIG. 15 is a block diagram showing an example of a configuration of a scoring device in a third example embodiment of the present invention.

FIG. 15 shows an example of a configuration of the scoring device 3. Referring to FIG. 15, the scoring device 3 includes a classifying unit 31 and an adding unit 32, for example. The scoring device 3 includes, for example, an arithmetic logic unit and a storage device that are not shown in the drawings. For example, the scoring device 3 realizes the respective processing units described above by the arithmetic logic unit executing a program stored in the storage unit that is not shown in the drawing.

The classifying unit 31 classifies answer data into a plurality of subsets. For example, the scoring device 3 stores the answer data in advance. Alternatively, the answer data is input into the scoring device 3. The classifying unit 31 of the scoring device 3 classifies the answer data stored in advance or the input answer data into a plurality of subsets.

The adding unit 32 adds a scoring criterion to be used in scoring the answer data based on the result of classification by the classifying unit 31.

Thus, the scoring device 3 includes the classifying unit 31 and the adding unit 32. Such a configuration allows the adding unit 32 to add a scoring criterion to be used in scoring the answer data based on the result of classification by the classifying unit 31. As a result, the scoring device 3 can score the answer data based on the scoring criteria with the scoring criterion being added by the adding unit 32. Thus, according to the scoring device 3 described in this example embodiment, a scoring criterion to be the scoring criteria is added by selection by the scorer. Therefore, it becomes possible to perform scoring efficiently while preventing the occurrence of erroneous determination such as determining an answer that should be correct actually as an incorrect answer due to fluctuations in words and phrases. In addition, since scoring is performed based on the scoring criteria, it is possible to suppress variations in scoring with scorers.

Further, the scoring device 3 described above can be realized by installation of a given program in the scoring device 3. To be specific, a program according to another aspect of the present invention is a program for causing an information processing device to realize the classifying unit 31 that classifies answer data into a plurality of subsets and the adding unit 32 that adds a scoring criterion used in scoring the answer data based on the result of classification by the classifying unit 31.

Further, a scoring method executed by the scoring device 3 described above is a method by which an information processing device classifies answer data into a plurality of subsets and adds a scoring criterion used in scoring the answer data based on the result of classification.

Since the inventions of the program and the scoring method having the configurations described above also have the same effects as the scoring device 3, the program and the scoring method can achieve the object of the present invention described above. Besides, a computer-readable recording medium on which the program is recorded can also achieve the object of the present invention described above because of the same reason.

<Supplementary Notes>

The whole or part of the example embodiments disclosed above can be described as the following supplementary notes. Below, the overview of the scoring device and so on of the present invention will be described. However, the present invention is not limited to the following configurations.

(Supplementary Note 1)

A scoring device comprising:
 a classifying unit configured to classify answer data into a plurality of subsets; and
 an adding unit configured to add a scoring criterion to be used in scoring the answer data based on a result of classifying by the classifying unit.

(Supplementary Note 2)

The scoring device according to Supplementary Note 1, wherein:
 the classifying unit is configured to classify the answer data into the subsets by clustering the answer data; and
 the adding unit is configured to add, to the scoring criterion, a representative sentence representing a cluster generated by clustering the answer data by the classifying unit.

(Supplementary Note 3)

The scoring device according to Supplementary Note 2, wherein the adding unit is configured to add the representative sentence to the scoring criterion based on a degree of similarity of the cluster generated by clustering the answer data.

(Supplementary Note 4)

The scoring device according to Supplementary Note 2, wherein:
 the classifying unit includes a display unit configured to display a result of clustering by the classifying unit; and
 the adding unit is configured to accept input by a scorer relating to the result of clustering by the classifying unit displayed by the display unit, and add the representative sentence to the scoring criterion based on the accepted input.

(Supplementary Note 5)

The scoring device according to Supplementary Note 4, wherein the display unit is configured to perform a given display control based on a degree of similarity of the cluster generated by clustering the answer data.

(Supplementary Note 6)

The scoring device according to Supplementary Note 5, wherein the display unit is configured to change a position to display the cluster based on the degree of similarity of the cluster generated by clustering the answer data.

(Supplementary Note 7)

The scoring device according to Supplementary Note 5 or 6, wherein the display unit is configured to highlight the displayed cluster based on the degree of similarity of the cluster generated by clustering the answer data.

(Supplementary Note 8)

The scoring device according to any one of Supplementary Notes 5 to 7, wherein the display unit is configured to control an order of the displayed cluster based on the degree of similarity of the cluster generated by clustering the answer data.

(Supplementary Note 9)

The scoring device according to any one of Supplementary Notes 1 to 8, further comprising an excluding unit configured to exclude part of the answer data based on the scoring criterion,
wherein the classifying unit is configured to classify remaining answer data that are answers except the part excluded by the excluding unit among the answer data.

(Supplementary Note 10)

The scoring device according to Supplementary Note 9, further comprising a determining unit configured to determine whether or not a ratio of a number of the remaining answer data to a number of the answer data is more than a predetermined threshold value,
wherein the determining unit is configured to, when the ratio of the number of the remaining answer data to the number of the answer data is more than the predetermined threshold value, determine that the classifying unit classifies the answer data into a plurality of subsets.

(Supplementary Note 11)

The scoring device according to Supplementary Note 10, further comprising a scoring unit configured to, when the determining unit determines that the ratio of the number of the remaining answer data to the number of the answer data is equal to or less than the predetermined threshold value, score answers except the remaining answer data among the answer data based on the scoring criterion.

(Supplementary Note 12)

A scoring method executed by an information processing device, the scoring method comprising:
classifying answer data into a plurality of subsets; and
adding a scoring criterion to be used in scoring the answer data based on a result of the classifying.

(Supplementary Note 13)

A non-transitory computer-readable recording medium having a program recorded thereon, the program comprising instructions for causing an information processing device to realize:
a classifying unit configured to classify answer data into a plurality of subsets; and
an adding unit configured to add a scoring criterion to be used in scoring the answer data based on a result of classifying by the classifying unit.

The program described in the example embodiments and supplementary notes is stored in a storage device or recorded on a computer-readable recording medium. For example, the recording medium is a portable medium such as a flexible disk, an optical disk, a magnetooptical disk, and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

DESCRIPTION OF REFERENCE NUMERALS 1 scoring device
11 operation input unit
12 screen display unit
13 communication I/F unit
14 storage unit
141 answer data
142 model answer
143 example answer
144 program
15 arithmetic logic unit
151 clustering unit
152 display unit
153 additional example answer accepting unit
154 scoring unit
155 additional example answer selection unit
2 scoring device
24 storage unit
244 exclusion threshold value
245 program
25 arithmetic logic unit
255 exclusion unit
256 determination unit
3 scoring device
31 classifying unit
32 adding unit

The invention claimed is:

1. A scoring device comprising:
a display device;
one or more memories storing instructions and answer data; and
one or more processors configured to execute the instructions to implement:
an excluding unit configured to control an exclusion operation to exclude part of the answer data to obtain remaining answer data;
a determining unit configured to compare a ratio of the remaining answer data to all answers in the answer data, control the excluding unit to repeat the exclusion operation on the remaining answer data based on the ratio exceeding an exclusion threshold value, and control the remaining answer data to be classified into a plurality of subsets based on the ratio exceeding the exclusion threshold value;
a classifying unit configured to classify the remaining answer data into the plurality of subsets and obtain a plurality of representative sentences respectively representing the plurality of subsets, based on the determining unit determining the ratio exceeds the exclusion threshold value;
a display unit configured to control the display device to present a result of classifying by the classifying unit and the plurality of representative sentences;
an adding unit configured to add a scoring criterion to be used in scoring the answer data based on a user selection made with respect to one of the plurality of representative sentences presented by the display device, and control the excluding unit to control the exclusion operation to be performed again to reduce the remaining answer data; and a scoring unit configured to, based on the determining unit determining that the ratio is equal to or less than the exclusion threshold value:

automatically score answers except the remaining answer data among the answer data based on the scoring criterion; and visually score the remaining answer data.

2. The scoring device according to claim 1, wherein:

the classifying unit is configured to classify the answer data into the plurality of subsets by clustering the answer data; and the adding unit is configured to add, to the scoring criterion, a representative sentence representing a cluster generated by clustering the answer data by the classifying unit.

3. The scoring device according to claim 2, wherein the adding unit is configured to add the representative sentence to the scoring criterion based on a degree of similarity of the cluster generated by clustering the answer data.

4. The scoring device according to claim 2, wherein the display unit is configured to control display of the result based on a degree of similarity of the cluster generated by clustering the answer data.

5. The scoring device according to claim 4, wherein the display unit is configured to change a position to display the cluster based on the degree of similarity of the cluster generated by clustering the answer data.

6. The scoring device according to claim 4, wherein the display unit is configured to highlight the displayed cluster based on the degree of similarity of the cluster generated by clustering the answer data.

7. The scoring device according to claim 4, wherein the display unit is configured to control an order of the displayed cluster based on the degree of similarity of the cluster generated by clustering the answer data.

8. A scoring method executed by an information processing device, the scoring method comprising:

controlling an exclusion operation to exclude part of answer data to obtain remaining answer data;

comparing a ratio of the remaining answer data to all answers in the answer data;

repeating the exclusion operation on the remaining answer data based on the ratio exceeding an exclusion threshold value;

classifying the remaining answer data into a plurality of subsets and obtaining a plurality of representative sentences respectively representing the plurality of subsets, based on determining the ratio exceeds the exclusion threshold value;

controlling a display device to present a result of the classifying and the plurality of representative sentences;

adding a scoring criterion to be used in scoring the answer data based on a user selection made with respect to one of the plurality of representative sentences presented by the display device;

controlling the exclusion operation to be performed again to reduce the remaining answer data;

automatically scoring answers except the remaining answer data among the answer data based on the scoring criterion, based on the determining unit determining that the ratio is equal to or less than the exclusion threshold value; and visually scoring the remaining answer data, based on the determining unit determining that the ratio is equal to or less than the exclusion threshold value.

9. A non-transitory computer-readable recording medium having a program recorded thereon, the program comprising instructions for causing an information processing device to realize:

an excluding unit configured to control an exclusion operation to exclude part of answer data to obtain remaining answer data;

a determining unit configured to compare a ratio of the remaining answer data to all answers in the answer data, control the excluding unit to repeat the exclusion operation on the remaining answer data based on the ratio exceeding an exclusion threshold value, and control the remaining answer data to be classified into a plurality of subsets based on the ratio not exceeding the exclusion threshold value;

a classifying unit configured to classify the remaining answer data into the plurality of subsets and obtain a plurality of representative sentences respectively representing the plurality of subsets, based on the determining unit determining the ratio does not exceed the exclusion threshold value;

a display unit configured to control a display device to present a result of classifying by the classifying unit and the plurality of representative sentences;

an adding unit configured to add a scoring criterion to be used in scoring the answer data based on a user selection made with respect to one of the plurality of representative sentences presented by the display device, and control the excluding unit to control the exclusion operation to be performed again to reduce the remaining answer data; and a scoring unit configured to, based on the determining unit determining that the ratio is equal to or less than the exclusion threshold value:

automatically score answers except the remaining answer data among the answer data based on the scoring criterion; and visually score the remaining answer data.

* * * * *